United States Patent
Nakamoto et al.

(10) Patent No.: US 12,551,936 B2
(45) Date of Patent: Feb. 17, 2026

(54) LASER CLEANING METHOD, LASER PROCESSING APPARATUS, AND LASER PROCESSING SYSTEM

(71) Applicant: Kabushiki Kaisha Toshiba, Tokyo (JP)

(72) Inventors: Yuta Nakamoto, Yokohama Kanagawa (JP); Ryuichi Togawa, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 138 days.

(21) Appl. No.: 18/414,346

(22) Filed: Jan. 16, 2024

(65) Prior Publication Data

US 2024/0253089 A1    Aug. 1, 2024

(30) Foreign Application Priority Data

Jan. 26, 2023 (JP) .................. 2023-010220

(51) Int. Cl.
*B08B 7/00* (2006.01)
*B23K 26/03* (2006.01)
*B23K 26/064* (2014.01)

(52) U.S. Cl.
CPC .......... *B08B 7/0042* (2013.01); *B23K 26/032* (2013.01); *B23K 26/064* (2015.10)

(58) Field of Classification Search
None
See application file for complete search history.

(56) References Cited

U.S. PATENT DOCUMENTS

| | | | |
|---|---|---|---|
| 2002/0134770 A1* | 9/2002 | Freiwald | B23K 26/0096 219/121.84 |
| 2004/0224508 A1* | 11/2004 | Engel | B23K 26/082 438/689 |
| 2016/0164067 A1 | 6/2016 | Kobayashi | |
| 2020/0001393 A1* | 1/2020 | Philippron | B23K 26/032 |
| 2021/0114072 A1* | 4/2021 | Latouche | B21C 51/00 |
| 2023/0019043 A1 | 1/2023 | Momi | |

FOREIGN PATENT DOCUMENTS

| | | |
|---|---|---|
| JP | 2013-140682 A | 7/2013 |
| JP | 2015-217427 A | 12/2015 |
| JP | 2016-110838 A | 6/2016 |
| JP | 2021-085836 A | 6/2021 |
| WO | 2022054793 A1 | 3/2022 |

\* cited by examiner

*Primary Examiner* — Eric W Golightly
(74) *Attorney, Agent, or Firm* — Kim & Stewart LLP

(57) ABSTRACT

A laser cleaning process for removing foreign matter from a processing portion of a base material includes: determining that the foreign matter is on the processing portion; determining a state of the foreign matter; determining whether the foreign matter can be removed from the processing portion; and if the foreign matter has been determined to be removable from the processing portion, removing the foreign matter from the processing portion.

6 Claims, 6 Drawing Sheets

LASER CLEANING METHOD, LASER PROCESSING APPARATUS, AND LASER PROCESSING SYSTEM

CROSS-REFERENCE TO RELATED APPLICATION(S)

This application is based upon and claims the benefit of priority from Japanese Patent Application No. 2023-010220, filed Jan. 26, 2023, the entire contents of which are incorporated herein by reference.

FIELD

Embodiments described herein relate generally to a laser cleaning method, a laser processing apparatus, and a laser processing system.

BACKGROUND

Laser welding is widely used as a method for bonding components. In laser welding, the components are welded using a laser such as a pulsed laser. In case of performing laser welding, when liquid or solid is on a bonding surface of an object to be bonded, the object to be bonded is not sufficiently melted and strength of a bonding portion becomes weak, resulting in deterioration of reliability of the bonding portion.

Therefore, there is a demand for a laser cleaning method for welding objects to be bonded with high reliability regardless of a state of bonding surfaces of the objects to be bonded.

DETAILED DESCRIPTION

Embodiments provide a laser cleaning method with high reliability by determining a presence of a residual on a laser irradiation surface of an object to be bonded and removing the residual, before performing laser welding.

In general, according to one embodiment, there is provided a laser cleaning process for removing a foreign matter from a processing portion of a base material that includes: determining that the foreign matter is on the processing portion; determining a state of the foreign matter; determining whether the foreign matter can be removed from the processing portion; and removing from the processing portion the foreign matter that has been determined to be removable from the processing portion.

Hereinafter, a laser cleaning method, a laser processing apparatus, and a laser processing system according to embodiments will be described with reference to the drawings. In the present specification, a vertically upward direction is defined as an upward direction, and a vertically downward direction is defined as a downward direction.

First Embodiment

A laser cleaning method, a laser processing apparatus, and a laser processing system according to a first embodiment will be described with reference to FIGS. 1 to 6B.

Figure 1:
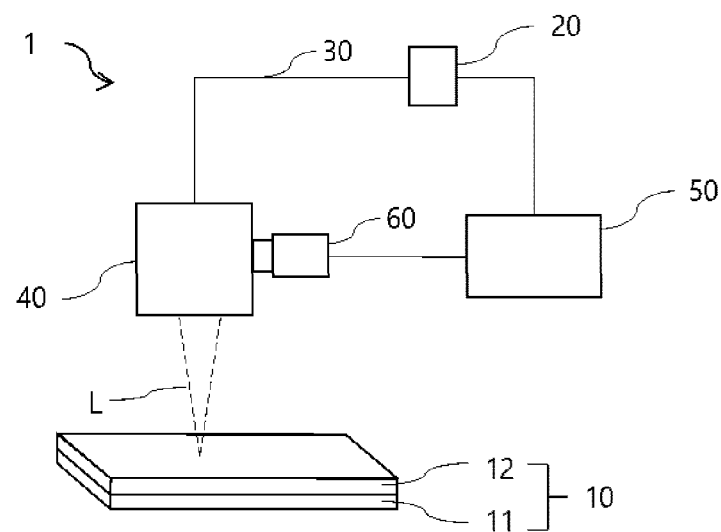
FIG. 1 is a schematic diagram of a laser processing apparatus according to a first embodiment.

First, the laser processing apparatus will be described. The processing in the present embodiment includes laser cleaning of a base material surface, welding of the base material by laser welding, and the like. In addition, in the laser cleaning, by laser irradiation, a portion that can be cleaned, a portion that can be welded during the laser welding, and the like are referred to as a processing portion. FIG. 1 shows a schematic diagram of a laser processing apparatus according to a first embodiment. The laser processing apparatus 1 generates a laser that is irradiated on an object 10 to be bonded to melt a part of the object 10 and then solidify the melted part to perform bonding in the object 10. For example, as shown in FIG. 1, welding can be performed by irradiating with the laser L the object 10 in which a base material 11 and a base material 12 are stacked. The object 10 includes iron, aluminum, copper, and the like. The laser processing apparatus 1 includes a laser oscillator 20, a transmission circuit 30, a processing head 40 that includes an optical system lens and the like, a control circuit 50 that controls the laser oscillator 20, and a camera 60 that images a bonding portion 13 (see FIGS. 6A and 6B) of the object 10. Prior to performing bonding in the object 10, the base material 11 is placed on a stage (not shown), and an upper surface of the base material 11 is observed and cleaned. Then, the base material 12 is stacked on top of the base material 12. The bonding portion 13 refers to a surface of the base material 11 that overlaps with and faces the base material 12.

A laser oscillator that is capable of generating a laser with pulse oscillation or continuous oscillation can be used for the laser oscillator 20. For example, an yttrium aluminum garnet (YAG) laser oscillator can be used.

The transmission circuit 30 is provided between the laser oscillator 20 and the processing head 40 to transmit the laser L oscillated from the laser oscillator 20 to the processing head 40. The transmission circuit 30 can be, for example, an optical fiber.

The processing head 40 has a scanner or a torch, and directs the laser L, which is transmitted from the transmission circuit 30, to the processing portion. For example, when the processing head 40 has a torch, the processing head 40 has a collimating lens and a condensing lens that adjusts the incident laser L to be substantially parallel.

As described above, the processing head 40 directs the laser L to the object 10. In the present embodiment, the laser irradiated on the object 10 is denoted as a laser L. The control circuit 50 controls an operation of the laser oscillator 20 provided in the laser processing apparatus 1. The laser control unit 50 may be connected to the laser oscillator 20 to enable pulse oscillation. The control circuit 50 sets a time interval, an oscillation frequency and emission energy of the pulses output from the laser oscillator 20, a position where the laser L is irradiated, and the like.

The camera 60 captures a processing portion of the base material 11. For example, the camera 60 captures the bonding portion 13. The camera 60 has no limitation in an imaging range as long as the processing portion to be welded by the laser L, such as the bonding portion 13, is captured. The camera 60 can image the bonding portion 13 by placing the camera 60 adjoining the processing head 40, there is a high possibility that the processing portion will come into the photographic field of view of camera 60, so the camera 60 and the processing head 40 are placed adjoining each other. In some embodiments, the camera 60 may be provided outside the laser processing apparatus 1 separately from the laser processing apparatus 1.

Moreover, the laser processing apparatus 1 may have a control circuit 70 which will be described later.

Figure 2:
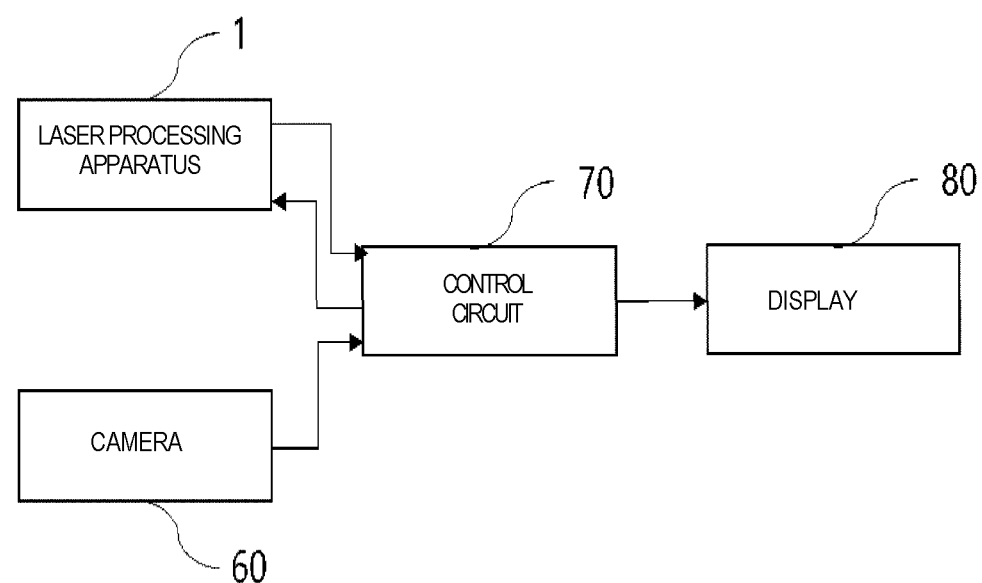
FIG. 2 is a block diagram showing a laser processing system according to the first embodiment.

Next, a laser processing system will be described. FIG. 2 is a block diagram showing the laser processing system according to the first embodiment. In addition to the laser processing apparatus 1 shown in FIG. 1, the laser processing system may include the control circuit 70 that determines a state of the processing portion based on an image of the processing portion of the base material 11, which is captured by the camera 60, and may further include a display 80 that displays a determination content of the control circuit 70. In this case, the determination in the present embodiment refers to, for example, determination such as whether the foreign matter is on the bonding portion 13, which is the processing portion of the base material 11, a state of the foreign matter, a surface area or thickness of the foreign matter, and whether the foreign matter is removable.

The control circuit 70 determines the surface state of the processing portion by collecting data about the surface state of the processing portion as an image. For example, the control circuit 70 determines the surface state of the bonding portion 13 by collecting the data about the surface state of the bonding portion 13 of the base material 11 as an image. Specifically, it determines whether or not the foreign matter exists in the bonding portion 13 of the base material 11 using the image captured by the camera 60. When the foreign matter is determined to exist, it is further determined whether the foreign matter is liquid or solid. Thereafter, it determines whether or not the foreign matter is removable, and when the foreign matter is removable, the foreign matter is moved to a position that does not affect the processing by the laser L or the foreign matter is removed by directly irradiating it with the laser L. Further, the control circuit 70 may be provided inside the laser processing apparatus 1 or outside the laser processing apparatus 1. For example, the control circuit 70 can be a computer, as long as it has an arithmetic logic element such as a central processing unit (CPU) and a storage element such as a semiconductor memory.

The display 80 is, for example, a liquid crystal display for alerting by video. Alternatively to the display 80, an LED lamp may be provided for alerting by light or color, or a speaker or siren may be provided for alerting by sound. The display 80 displays outputs that indicate whether the foreign matter exists on the processing portion and whether the foreign matter is removable, which are results determined by the control circuit 70, to alert the user.

Figure 3:
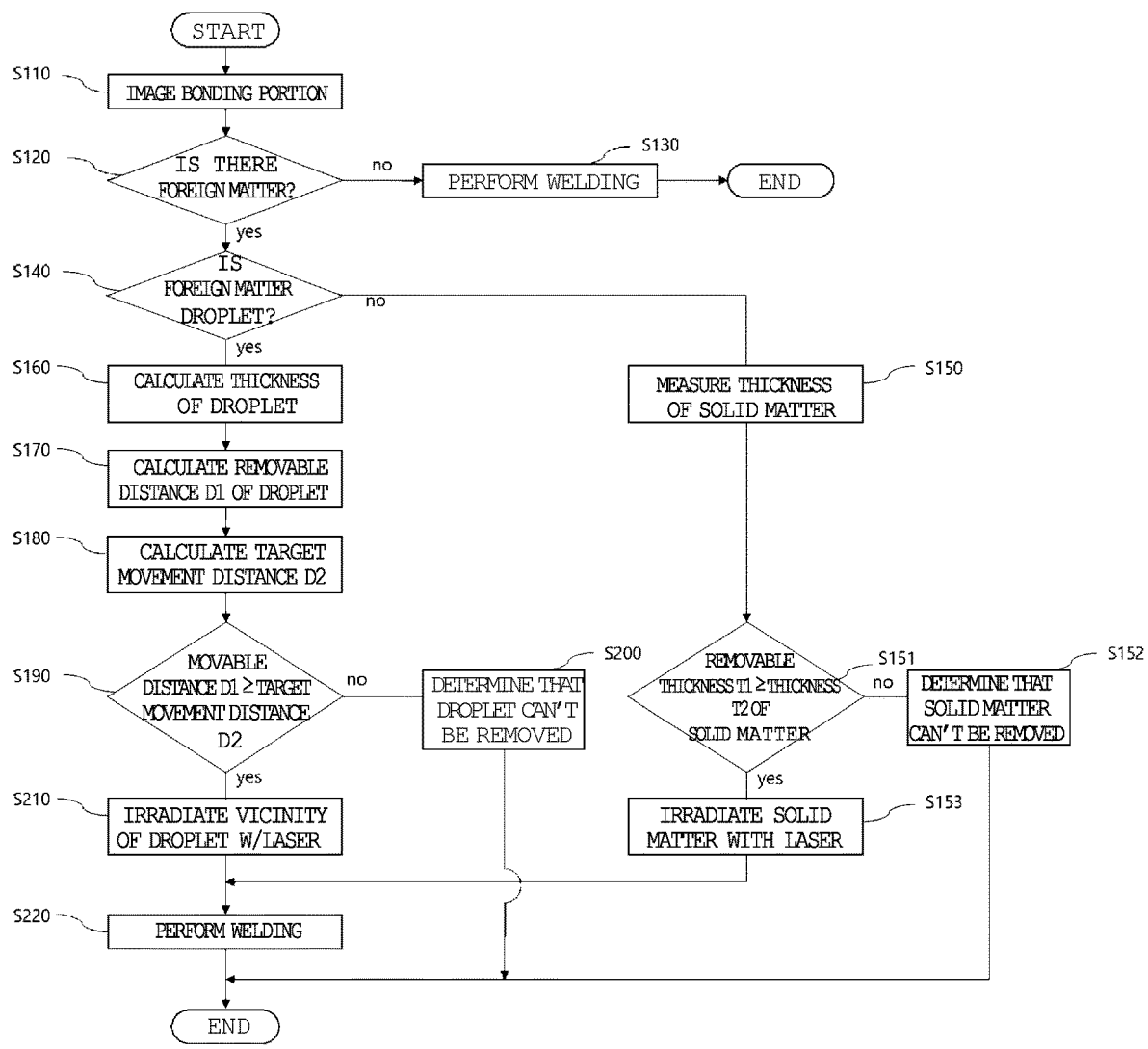
FIG. 3 is a flowchart showing an example of a laser cleaning method and a laser welding method according to the first embodiment.

Next, a laser cleaning method and a laser welding method will be described. FIG. 3 is a flowchart showing an example of a laser cleaning method and a laser welding method according to the first embodiment.

First, in step S110, the bonding portion 13 on the surface of the base material 11 is captured by the camera 60.

Subsequently, in step S120, it is determined whether the foreign matter is on the bonding portion 13 from the image captured in step S110. The determination may be made by the user looking at the image or by using artificial intelligence (AI) such as by using image recognition AI. When the foreign matter is on the bonding portion 13, if the welding is performed by stacking the base material 12 on the base material 11 without removing the foreign matter, there is a high possibility of defective bonding. When the foreign matter is not on the bonding portion 13, even if the bonding is performed by stacking the base material 12 without adding other processes, it is considered that there is a low possibility of defective bonding. Therefore, when the foreign matter is not on the bonding portion 13, the process proceeds to step S130, and when the foreign matter is on the bonding portion 13, the process proceeds to step S140. In this case, the foreign matter may be displayed on the display 80 to alert the user.

In step S130, because no foreign matter is on the bonding portion 13 on the surface of the base material 11, the base material 12 is stacked on top of the base material 11 and the surface is irradiated with the laser L, so that the base material 11 and the base material 12 are bonded, and then an alert thereof is given, thereby completing the process. The output of the laser L for the irradiation, for example, a maximum value that does not damage the object 10.

In step S140, it is determined whether the foreign matter on the base material 11 is liquid or solid. The determination of whether it is liquid or solid can be made using reflectance and transmittance, and by observing the color and whether the base material 11 can be seen through. Furthermore, the presence or absence of a curved surface of the foreign matter can be determined using the radius of curvature, and it can be determined whether the foreign matter is liquid or solid. For example, when the foreign matter on the base material 11 is colorless and transparent, the foreign matter is determined as liquid, and when the foreign matter has color, the foreign matter is determined as solid. Specifically, it is possible to determine whether the foreign matter is colored by using luminance. In the image captured by the camera 60, when the luminance at a portion of the foreign matter has a value greater than a certain value, the foreign matter is determined as liquid, and when the luminance has a value less than the certain value, the foreign matter is determined as solid. Alternatively, when the bonding portion 13 can be seen through the foreign matter on the base material 11, the foreign matter is determined as liquid, and when the bonding portion 13 cannot be seen through the foreign matter on the base material 11, the foreign matter is determined as solid. In addition, when the foreign matter seen from a thickness direction of the foreign matter, the foreign matter is determined as liquid when the foreign matter has a curved surface, and the foreign matter is determined as solid when the foreign matter has no curved surface. However, these are just examples, and the determination of whether the foreign matter is liquid or solid is not limited to these. When the foreign matter is liquid, the process proceeds to step S160. When the foreign matter is not liquid, the foreign matter is considered as solid, and the process proceeds to step S150. In the present embodiment, the liquid foreign matter is denoted as a droplet 90, and the solid foreign matter is denoted as a solid matter 100.

In step S150, a thickness T2 of the solid matter is measured. The thickness T2 of the solid matter refers to a thickness of the solid matter 100 that is on the bonding portion 13 in an upward direction. After measuring the thickness T2 of the solid matter, the process proceeds to step S151.

Figure 4A:
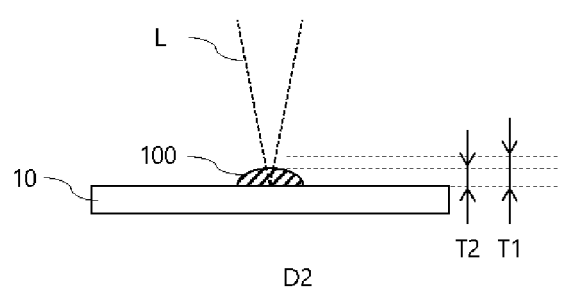
FIGS. 4A and 4B are schematic diagrams of step S151 of the first embodiment.
Figure 4B:
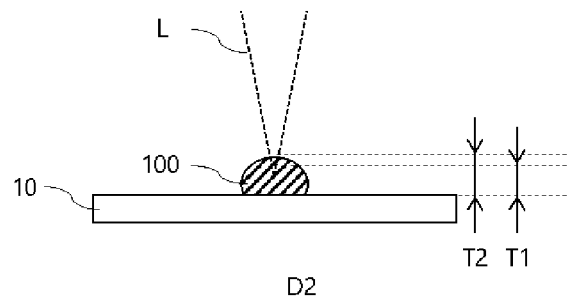

In step S151, it is determined whether or not a removable thickness T1 is larger than the thickness T2 of the solid matter. FIGS. 4A and 4B show schematic diagrams of step S151 according to the first embodiment. The removable thickness T1 refers to a maximum thickness of the solid matter 100 that can be removed with the output of the laser L set at a magnitude that does not damage the object 10. The removable thickness T1 depends on the magnitude of the output of the laser L. By comparing the removable thickness T1 with the solid matter thickness T2, it is possible to determine whether the solid matter 100 on the bonding portion 13 can be removed. When the removable thickness T1 is larger than the thickness T2 of the solid matter as shown in FIG. 4A, it is determined that the solid matter can be removed by irradiation with the laser L. On the other hand, when the removable thickness T1 is smaller than the thickness T2 of the solid matter as shown in FIG. 4B, it is determined that the solid matter cannot be removed by irradiation with the laser L. Therefore, when the removable thickness T1 is larger than the thickness T2 of the solid matter, the process proceeds to step S153, and when the removable thickness T1 is smaller than the thickness T2 of the solid matter, the process proceeds to step S152. When the removable thickness T1 is the same as the thickness T2 of the solid matter, it is determined that the solid matter can be removed by irradiation with the laser L, and the process proceeds to step S153.

In step S152, after alerting that it is determined that the bonding is defective, the solid matter 100 is not irradiated with the laser L and the process is completed. The expression "defective" herein means that the solid matter 100 cannot be removed by an output of the laser L having a certain magnitude (e.g., magnitude that does not damage the object 10). In step S153, the laser L is directed to the solid matter 100 to remove the solid matter 100 from the bonding portion 13. Thereafter, the process proceeds to step S220. When the base material 11 (see FIG. 1) is not to be bonded, the process may be completed without proceeding to step S220 after removing the solid matter 100, that is, after cleaning the bonding portion 13.

In step S160, a thickness of the droplet 90 on the base material 11 is calculated. The thickness of the droplet 90 can be calculated from a physical property value of the droplet 90, a physical property value of the object 10, a surface area of the droplet 90, and the like. To calculate the thickness of the droplet 90, it is necessary to input in advance a type of the droplet 90 and the physical property value of the droplet 90 into the control circuit 70. For example, when a battery member is bonded, there is a high possibility that an electrolyte used in a battery is on the bonding portion 13, so that a physical property value of the electrolyte or the like may be input. In addition, physical property values of oils and fats that may have adhered to the bonding portion 13 during a manufacturing process, or physical property value of a washing liquid used during the manufacturing process, or the like may be input. Next, the process proceeds to step S170.

In step S170, a movable distance D1 is calculated from the thickness and physical property value of the droplet 90 calculated in step S160. The movable distance D1 is a distance by which the droplet 90 can be moved by the laser L, and is a distance by which the droplet 90 can be moved when the vicinity of the droplet 90 is irradiated for a predetermined time with the laser L having a predetermined magnitude. In advance, a relationship between the thickness of the droplet 90 and the movable distance D1 of the droplet 90 is found from experiments or simulations, and the movable distance D1 depends on the thickness of the droplet 90. For example, when the thickness of the droplet 90 is less, the movable distance D1 is larger than when the thickness of the droplet 90 is greater. After calculating the movable distance D1, the process proceeds to step S180. In addition, the movable distance D1 is a distance by which the droplet 90 can be moved by irradiating with the laser L for a predetermined time, but the predetermined time herein refers to an allowable amount of time in a step of removing the foreign matter by irradiating with the laser so that manufacturing efficiency is not lowered.

In step S180, a target movement distance D2 is calculated. The target movement distance D2 is a distance from an end portion of the droplet 90 that is closest to a target position G to which the droplet 90 is to be moved, to the target position G. The target position G is a certain position on a portion of the surface of the base material 11 that does not affect processing, for example, outside of the bonding portion 13. To shorten the distance by which the droplet 90 is moved by the laser L, it is preferable that the target position G is, for example, a position outside the bonding portion 13 that is closest to the droplet 90. After calculating the target movement distance D2, the process proceeds to step S190.

Figure 5A:
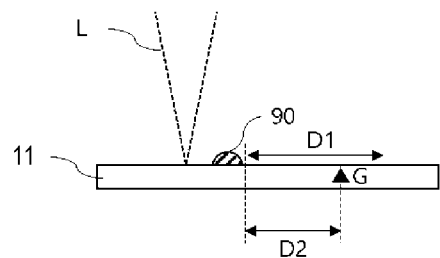
FIGS. 5A and 5B are schematic diagrams of step S190 of the first embodiment.
Figure 5B:
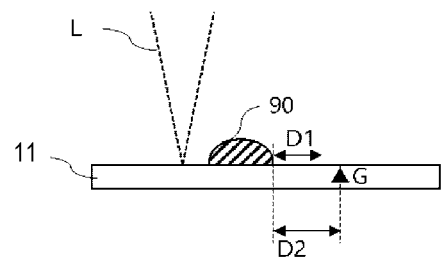

In step S190, it is determined whether the movable distance D1 is larger than the target movement distance D2. By comparing the movable distance D1 with the target movement distance D2, it is possible to determine whether the droplet 90 can be removed from the processing portion by irradiation with the laser L. Next, a specific method for comparing the movable distance D1 with the target movement distance D2 will be described. FIGS. 5A and 5B show schematic diagrams of step S190 according to the first embodiment. The determination is made whether the movable distance D1 is larger than the target movement distance D2 as shown in FIG. 5A or whether the movable distance D1 is smaller than the target movement distance D2 as shown in FIG. 5B. When the movable distance D1 is larger than the target movement distance D2, that is, when the droplet 90 can be moved outside the bonding portion 13, it is determined that the droplet 90 can be removed from the processing portion, and the process proceeds to step S210. When the movable distance D1 is smaller than the target movement distance D2, that is, when the droplet 90 cannot be moved outside the processing portion of the object 10, it is determined that the droplet 90 cannot be removed from the processing portion, and the process proceeds to step S200. The determination content in step S190 may be displayed on the display 80 to alert the user of the determination content. In this case, when the movable distance D1 is the same as the target movement distance D2, it is determined that the droplet 90 can be removed from the processing portion by irradiation with the laser L, and the process proceeds to step S210.

In step S200, after alerting that it is determined that the bonding is defective, the vicinity of the droplet 90 is not irradiated with the laser L and the process is completed. The expression "defective" herein means that the droplet 90 cannot be moved to the target position G with the output of the laser L set at a certain magnitude and the droplet 90 cannot be removed from the processing portion.

Figure 6A:
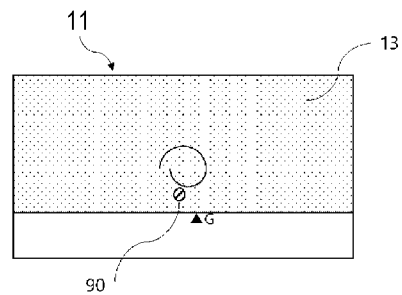
FIGS. 6A and 6B are schematic diagrams of a droplet that is removed by a laser in the first embodiment.
Figure 6B:
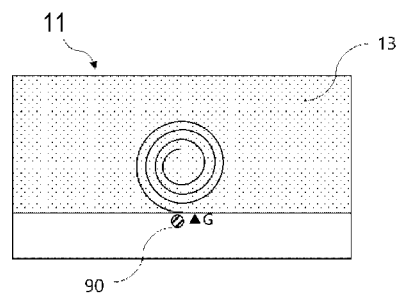

In step S210, the vicinity of the droplet 90 is irradiated with the laser L and the droplet 90 moves outside the bonding portion 13. In this case, the output of the laser L can be, for example, set at a maximum value that does not damage the base material 11. Although it is not always necessary to generate the laser L with the same output as the output when the object 10 is welded, in order to prevent damage to the base material 11, it is necessary to irradiate with the laser L having an output less than a maximum allowable value of the base material 11. In addition, the vicinity of the droplet 90 in the bonding portion 13 is irradiated with the laser L and the droplet 90 is not directly irradiated with the laser L. FIGS. 6A and 6B show schematic diagrams of a droplet that is removed from the processing portion by a laser according to the first embodiment. FIG. 6A shows a state in which the irradiation with the laser L starts. In this case, the droplet 90 is positioned within the bonding portion 13. For example, the laser irradiation is carried out such that the droplet 90 is moved from a center portion of a circle drawn on a surface of the object 10 in the vicinity of the droplet 90, toward an outer circumferential portion thereof by heat, and the droplet 90 reaches the target position G, which is a certain position outside the bonding portion 13, as shown in FIG. 6B. After the droplet 90 is moved outside the bonding portion 13, the process proceeds to step S220. The movement of the laser L to cause the droplet 90 to be moved away from the bonding portion 13 as shown in FIGS. 6A and 6B is an example, and a trajectory of the laser L is not limited to the depicted shape. When the base material 11 (see FIG. 1) is not bonded, the process may be completed without proceeding to step S220 after moving the droplet 90, that is, after cleaning the bonding portion 13. Before proceeding to step S220, the completion of foreign matter removal work may be displayed on the display 80 and alert the user of the completion.

In step S220, the object 10 is bonded, thereby completing the process. For example, when the foreign matter is not on the surface of the base material 11 (see FIG. 1), the base material 12 (see FIG. 1) is bonded to the base material 11 while being stacked on the base material 11.

In the laser cleaning method and the laser welding method in FIG. 3, the target movement distance D2 is calculated after calculating the movable distance D1 in the process from step S160 to step S180, but the movable distance D1 may be calculated after calculating the target movement distance D2. That is, the movable distance D1 and the target movement distance D2 may be calculated in any order.

According to the laser cleaning method of the present embodiment, since the foreign matter can be removed from the bonding portion 13 of the base material 11 before bonding the object 10 by the laser L, it is possible to provide a bonded product with less defective bonding.

Furthermore, according to the laser cleaning method of the present embodiment, by irradiating only the vicinity of the foreign matter to remove the foreign matter from the bonding portion 13, it is possible to perform laser welding on the object 10 in a shorter time than when removing the foreign matter completely.

Furthermore, according to the laser cleaning method of the present embodiment, the removal of the foreign matter from the bonding portion 13 of the base material 11 and the bonding of the object 10 after removing the foreign matter can be performed with the same laser processing machine.

In addition, although a step of removing the foreign matter that is on the base material 12 has not been described in the present embodiment, cleaning of the bonding portion of the base material 12 (e.g., on a surface that is to be bonded to the bonding portion 13 of the base material 11) may be performed separately from the cleaning step of the bonding portion 13 of the base material 11.

Second Embodiment

Next, a laser cleaning method and a laser welding method according to a second embodiment will be described with reference to FIG. 7. The present embodiment is different from the first embodiment in the laser cleaning method and the laser welding method by the control circuit 70. The above different points will be specifically described.

Figure 7:
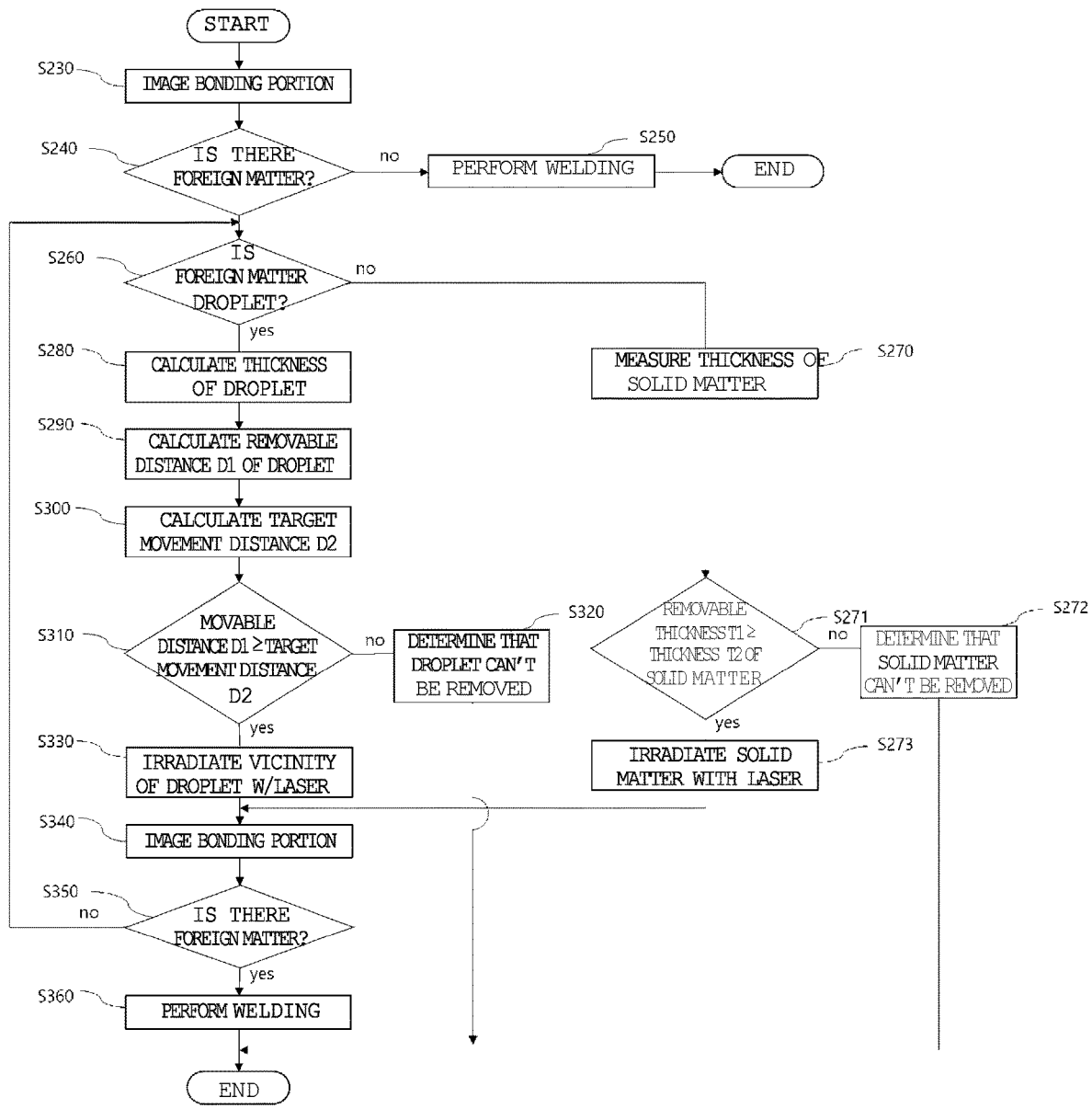
FIG. 7 is a flowchart showing an example of a laser cleaning method and a laser welding method according to a second embodiment.

FIG. 7 is a flowchart showing an example of the laser welding method according to the second embodiment. Steps S230 to S330 in the present embodiment can be the same steps as steps S110 to S210 in the first embodiment. In the first embodiment, it is not determined whether the foreign matter is removed from the bonding portion 13 after step S153 or step S210, but in the present embodiment, a step of determining whether the foreign matter has been removed from the bonding portion 13 by the camera 60 is provided after the step of removing the foreign matter from the bonding portion 13.

First, in step S230, the bonding portion 13 on the surface of the base material 11 is captured by the camera 60.

Subsequently, in step S240, it is determined whether the foreign matter is on the bonding portion 13 from the image captured in step S230. When the foreign matter is on the bonding portion 13, if the bonding is performed by stacking the base material 12 without removing the foreign matter, there is a high possibility of defective bonding. When the foreign matter is not on the bonding portion 13, even if the bonding is performed by stacking the base material 12 without adding other processes, it is considered that there is a low possibility of defective bonding. Therefore, when the foreign matter is not on the bonding portion 13 of the base material 11, the process proceeds to step S250, and when the foreign matter is on the bonding portion 13, the process proceeds to step S260. In this case, the foreign matter may be displayed on the display 80 to alert the user of its presence.

In step S250, since no foreign matter is on the bonding portion 13, which is the processing portion, the object 10 is bonded by laser irradiation, and then an alert thereof is given, thereby completing the process.

In step S260, it is determined whether the foreign matter is on the base material 11 is liquid. The state of the foreign matter is on the base material 11 is considered as liquid or solid. In the present embodiment, the liquid foreign matter is denoted as a droplet 90, and the solid foreign matter is denoted as a solid matter 100. When the foreign matter is liquid, the process proceeds to step S280. When the foreign matter is not liquid, the foreign matter is considered as solid, and the process proceeds to step S270.

In step S270, a thickness T2 of the solid matter is measured. The thickness T2 of the solid matter is a thickness of the solid matter 100 that is on the bonding portion 13 as described above. After measuring the thickness T2 of the solid matter, the process proceeds to step S271.

In step S271, it is determined whether or not a removable thickness T1 is larger than the thickness T2 of the solid matter. The removable thickness T1 is a maximum thickness of the solid matter 100 that can be removed with the same output of the laser L as when the object 10 is welded as described above. When the removable thickness T1 is larger than the thickness T2 of the solid matter, it is determined that the solid matter can be removed by irradiation with the laser L. On the other hand, when the removable thickness T1 is smaller than the thickness T2 of the solid matter, it is determined the solid matter cannot be removed by irradiation with the laser L. Therefore, when the removable thickness T1 is larger than the thickness T2 of the solid matter, the process proceeds to step S273, and when the removable thickness T1 is smaller than the thickness T2 of the solid matter, the process proceeds to step S272.

In step S272, the solid matter 100 is not irradiated with the laser L, and after alerting that it is determined that the bonding is defective, the process is completed. The expression "defective" herein means that the solid matter 100 cannot be removed with an output of the laser L set at the same magnitude as when the object 10 is welded.

In step S273, the solid matter 100 is directly irradiated with the laser L to remove the solid matter 100 from the bonding portion 13. Thereafter, the process proceeds to step S340.

In step S280, a thickness of the droplet 90 is on the base material 11 is calculated. As described above, the thickness of the droplet 90 can be calculated from a physical property value of the droplet 90, a physical property value of the object 10, a surface area of the droplet 90, and the like. After calculating the thickness of the droplet 90, the process proceeds to step S290.

In step S290, the movable distance D1 is calculated based on the thickness of the droplet 90 calculated in step S280. As described above, the movable distance D1 can be calculated from a physical property value of the droplet 90, a physical property value of the object 10, a surface area of the droplet 90, and the like. After calculating the movable distance D1, the process proceeds to step S300.

In step S300, a target movement distance D2 is calculated. The target movement distance D2 is a distance from an end portion of the droplet 90 to the target position G to which the droplet 90 is to be moved. The target position G is, as described above, a portion of the object 10 that does not affect the bonding, that is, a certain position outside the bonding portion 13. After calculating the target movement distance D2, the process proceeds to step S310.

In step S310, it is determined whether the movable distance D1 is larger than the target movement distance D2. By comparing the movable distance D1 with the target movement distance D2, it is possible to determine whether the droplet 90 can be removed by irradiation with the laser L. As described above, the movable distance D1 is compared with the target movement distance D2. When the movable distance D1 is larger than the target movement distance D2, the process proceeds to step S330. When the movable distance D1 is not larger than the target movement distance D2, the process proceeds to step S320.

In step S320, the vicinity of the droplet 90 is not irradiated with the laser L, and after alerting that it is determined that the bonding is defective, the process is completed.

In step S330, the surface of the object 10 is irradiated with the laser L in the vicinity of the droplet 90 to move the droplet 90 to an area outside the bonding portion 13. Thereafter, the process proceeds to step S340.

In step S340, the bonding portion 13 on the surface of the base material 11 is captured again by the camera 60. After imaging, the process proceeds to step S350.

In step S350, it is determined whether the foreign matter is on the bonding portion 13 from the image captured in step S340. The presence or absence of the foreign matter from the image may be determined by the user looking at the image or by using AI such as image recognition AI. When the foreign matter is not on the bonding portion 13, it is considered that the base material 12 may be bonded while being stacked without adding other processes. When the foreign matter is on the bonding portion 13, it is considered that a process for removing the foreign matter is required. Therefore, when the foreign matter is not on the bonding portion 13, the process proceeds to step S360. When the foreign matter is on the bonding portion 13, the process returns to step S260 and repeats the preceding steps. When the base material 11 (see FIG. 1) is not bonded, the process may be completed without proceeding to step S360 after recognizing the removal of the foreign matter, that is, after cleaning the bonding portion 13.

In step S360, after alerting that the object 10 is bonded, the process is completed.

In the laser welding method in FIG. 7, the target movement distance D2 is calculated after calculating the movable distance D1 in the process from step S280 to step S300, but the movable distance D1 may be calculated after calculating the target movement distance D2. That is, the movable distance D1 and the target movement distance D2 may be calculated in any order.

In addition, although a step of removing the foreign matter that is on the base material 12 has not been described in the present embodiment, cleaning of the bonding portion of the base material 12 (e.g., on a surface that is to be bonded to the bonding portion 13 of the base material 11) may be performed separately from the cleaning step of the bonding portion 13 of the base material 11.

According to the laser cleaning method and the laser welding method of the present embodiment, the bonding portion 13 is captured by the camera 60 after step S273 or step S330, and it is determined that the foreign matter is not on the bonding portion 13, and then the object 10 is welded by the laser L. For example, when a member of a battery such as a secondary battery is welded, an electrolyte is on the member. In general, an organic solvent is used as the electrolyte, and the organic solvent evaporates faster than water or the like. In this case, it is determined in step S260 that the foreign matter is the droplet 90 to evaporate the solvent during the step of calculating the thickness of the droplet 90, the step of calculating the movable distance D1, or the like, so that salt, which is a solid, may precipitate as the solid matter 100 in the bonding portion 13. That is, a state of the foreign matter, which is determined in step S260, may be changed from liquid to solid, and the foreign matter may not be removed only by removing the droplet 90. Therefore, according to the laser welding method of the present embodiment, the solid matter 100 is removed after removing the droplet 90 from the processing portion once. When it is determined that the foreign matter is not on the bonding portion 13, the welding can be performed on the object 10, and thus it is possible to provide a bonded product obtained by removing the foreign matter from the bonding portion with higher precision.

Third Embodiment

Next, a laser cleaning method and a laser welding method according to a third embodiment will be described with reference to FIGS. 8 and 9. The present embodiment is different from the second embodiment in the laser welding method performed by the control circuit 70. The different points will be specifically described below.

Figure 8:
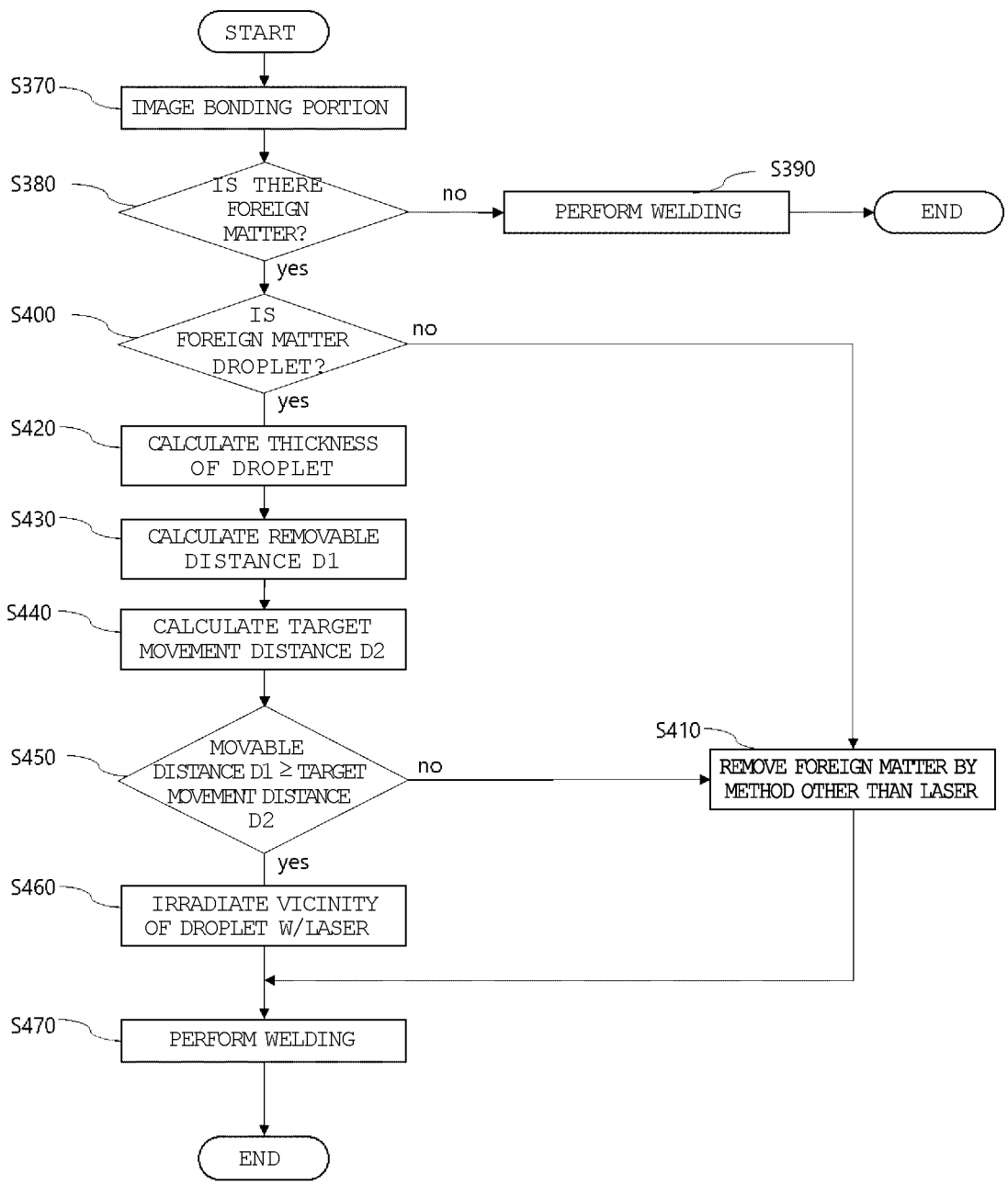
FIG. 8 is a flowchart showing an example of a laser cleaning method and a laser welding method according to a third embodiment.

FIG. 8 is a flowchart showing an example of the laser welding method according to the third embodiment.

First, in step S370, the bonding portion 13 on the surface of the base material 11 is captured by the camera 60.

Subsequently, in step S380, it is determined whether the foreign matter is on the bonding portion 13 from the image captured in step S370. The image may be determined by the user looking at the image or by using AI such as image recognition AI. When the foreign matter is on the bonding portion 13, if the bonding is performed by stacking the base material 12 without removing the foreign matter, there is a high possibility of defective bonding. When the foreign matter is not on the bonding portion 13, even if the base material 12 is bonded while being stacked without adding other processes, it is considered that there is a low possibility of being defective. Therefore, when the foreign matter is on the bonding portion 13, the process proceeds to step S400, and when the foreign matter is not adhered, the process proceeds to step S390.

In step S390, because there is no foreign matter in the bonding portion 13 on the surface of the base material 11, the object 10 is bonded by laser irradiation, and then an alert thereof is given, thereby completing the process.

In step S400, it is determined whether the foreign matter that is on the base material 11 is liquid. The state of the foreign matter that is on the bonding portion 13 of the base material 11 is considered as liquid or solid. In the present embodiment, the liquid foreign matter is denoted as a droplet 90, and the solid foreign matter is denoted as a solid matter 100. When the foreign matter is liquid, the process proceeds to step S420. When the foreign matter is not liquid, the foreign matter is considered as solid, and the process proceeds to step S410.

In S410, when the foreign matter is not the droplet 90, that is, when solid foreign matter is on the bonding portion 13, the foreign matter is removed by a method other than the laser L. For example, the user can remove the foreign matter by wiping off the surface of the object 10 with cloth, paper, or the like. Thereafter, the process proceeds to step S470. When the base material 11 (see FIG. 1) is not bonded, the process may be completed without proceeding to step S470 after removing the solid matter, that is, after cleaning the bonding portion 13. In step S420, a thickness of the droplet 90 is calculated. As described above, the thickness of the droplet 90 can be calculated from a physical property value of the droplet 90, a physical property value of the object 10, a surface area of the droplet 90, and the like.

In step S430, the movable distance D1 of the droplet 90 that is on the bonding portion 13 is calculated. As described above, since there is a correlation between the movable distance D1 of the droplet 90 and the thickness of the droplet 90, the movable distance D1 of the droplet 90 can be calculated from the thickness of the droplet 90 calculated in step S420. After calculating the removable distance D1 of the droplet 90, the process proceeds to step S430.

In step S440, a target movement distance D2 is calculated. As described above, the target movement distance D2 is a distance from an end portion of the droplet 90 to a target position G to which the droplet 90 is to be moved, and is a distance from the end portion of the droplet 90 to a certain position outside the bonding portion 13. After calculating the target movement distance D2, the process proceeds to step S450.

In step S450, it is determined whether the movable distance D1 is larger than the target movement distance D2. When the movable distance D1 is larger than the target movement distance D2, the droplet 90 can move outside an area of the bonding portion 13. On the other hand, when the movable distance D1 is not larger than the target movement distance D2, the droplet 90 cannot be moved outside the area of the bonding portion 13. Therefore, when the movable distance D1 is larger than the target movement distance D2, the process proceeds to step S460, and when the movable distance D1 is not larger than the target movement distance D2, the process proceeds to step S410.

In step S460, the surface of the object 10 is irradiated with the laser L in the vicinity of the droplet 90 to move the droplet 90 to an area outside the bonding portion 13. Thereafter, the process proceeds to step S470. When the base material 11 (see FIG. 1) is not bonded, the process may be completed without proceeding to step S470 after removing the droplet 90, that is, after cleaning the bonding portion 13.

In step S470, since the droplet 90 is considered to have moved outside the area of the bonding portion 13, which is the processing portion, the object 10 is irradiated with the laser L, thereby completing the process.

Figure 9:
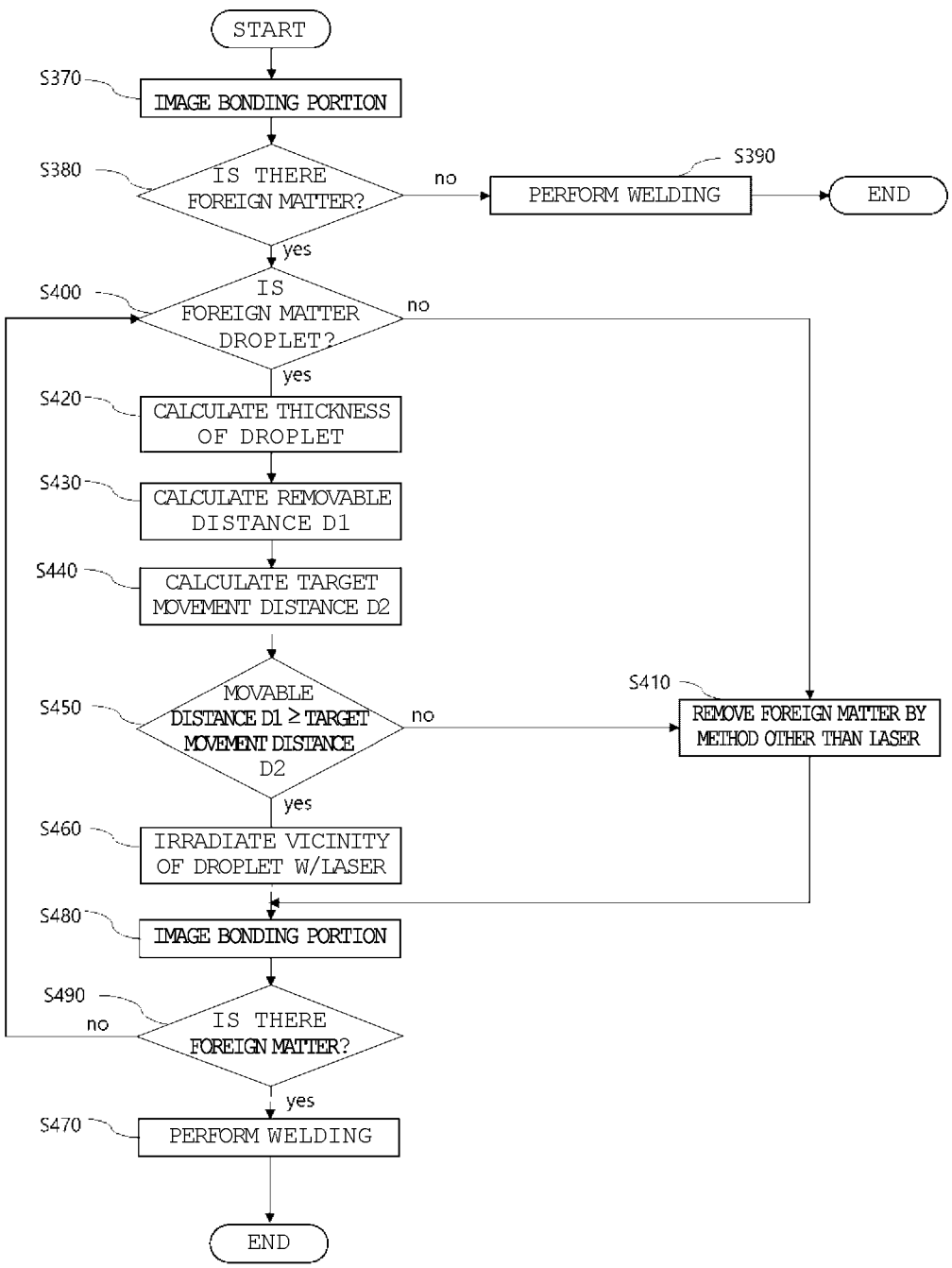
FIG. 9 is a flowchart showing another example of the laser cleaning method and the laser welding method according to the third embodiment.

FIG. 9 is a flowchart showing another example of the laser welding method according to the third embodiment. In the above-described laser welding method, the surface of the object 10 is irradiated with the laser L in the vicinity of the droplet 90 in step S460, and after the droplet 90 moves to the area outside the bonding portion 13, the object 10 is bonded in step S470. However, step S480 and step S490 may be added before performing the bonding.

In step S480, the bonding portion 13 is captured by the camera 60. After the bonding portion 13 is captured, the process proceeds to step S490.

In step S490, it is determined whether the foreign matter is on the bonding portion 13 of the base material 11 based on the image captured in step S480. When the foreign matter is on the bonding portion 13, if the bonding is performed by stacking the base material 12 without removing the foreign matter, there is a high possibility of defective bonding. When the foreign matter is not on the bonding portion 13, even if the base material 12 is bonded while being stacked without adding other processes, it is considered that there is a low possibility of being defective. Therefore, when the foreign matter is adhered, the process returns to step S400 and repeats the flow. When the foreign matter is not adhered, the process proceeds to step S470. When the base material 11 (see FIG. 1) is not bonded, the process may be completed without proceeding to step S470 after recognizing the removal of the foreign matter, that is, after cleaning the bonding portion 13.

In step S470, because there is no foreign matter on the bonding portion 13 of the base material 11, the object 10 is bonded by laser irradiation, thereby completing the process.

In addition, although a step of removing the foreign matter that is on the base material 12 has not been described in the present embodiment, cleaning of the bonding portion of the base material 12 (e.g., on a surface that is to be bonded to the bonding portion 13 of the base material 11) may be performed separately from the cleaning step of the bonding portion 13 of the base material 11.

According to the laser welding method of the present embodiment, since the object 10 is welded after removing the foreign matter from the bonding portion 13 of the base material 11, it is possible to provide a welded product with less defective welding caused by residual liquid or solid on the bonding portion 13. In addition, even when the foreign matter cannot be removed by irradiation with the laser L, the foreign matter can be removed by another method, and the bonding portion 13 is determined again by the image. If the foreign matter is removed, the object 10 can be welded. That is, it is considered that the number of defective products in the laser welding process can be reduced.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A laser cleaning method for removing foreign matter from a processing portion of a base material, comprising:
    determining that the foreign matter is on the processing portion;
    determining a state of the foreign matter;
    determining whether the foreign matter can be removed from the processing portion; and
    if the foreign matter has been determined to be removable from the processing portion, removing the foreign matter from the processing portion.

2. The laser cleaning method according to claim 1, wherein
    determining whether the foreign matter can be removed from the processing portion includes comparing a movable distance that is calculated from a thickness of the foreign matter in liquid state with a target movement distance for moving the foreign matter in liquid state.

3. The laser cleaning method according to claim 1, wherein
    determining the state of the foreign matter includes determining whether the foreign matter is liquid or solid.

4. The laser cleaning method according to claim 3, wherein
    foreign matter that is liquid is removed from the processing portion by irradiating a vicinity of the foreign matter with a laser to move the liquid to a region outside the processing portion.

5. The laser cleaning method according to claim 3, wherein
    foreign matter that is solid is removed from the processing portion by irradiating the foreign matter directly with a laser.

6. The laser cleaning method according to claim 1, further comprising:
    determining whether the foreign matter has been removed.

* * * * *